United States Patent
Hidaka et al.

(10) Patent No.: US 6,954,213 B1
(45) Date of Patent: Oct. 11, 2005

(54) OBJECTIVE AUTOMATED COLOR MATCHING BETWEEN INPUT AND OUTPUT DEVICES

(75) Inventors: Yumiko Hidaka, Inagi (JP); Toshiyuki Mizuno, Yokohama (JP); Yoshinobu Shiraiwa, Machida (JP)

(73) Assignee: Canon Kabushiki Kaisha, Tokyo (JP)

(*) Notice: Subject to any disclaimer, the term of this patent is extended or adjusted under 35 U.S.C. 154(b) by 733 days.

(21) Appl. No.: 09/615,780

(22) Filed: Jul. 13, 2000

Related U.S. Application Data

(62) Division of application No. 08/724,481, filed on Oct. 1, 1996, now Pat. No. 6,118,455.

(30) Foreign Application Priority Data

Oct. 2, 1995 (JP) .............................................. 7-255140
Dec. 28, 1995 (JP) .............................................. 7-343849

(51) Int. Cl.[7] .............................................. G09G 5/02
(52) U.S. Cl. .............................. 345/589; 345/594
(58) Field of Search ................................ 345/419, 420, 345/421, 422, 423, 424, 426, 427, 428, 581, 582, 583, 589, 590, 591, 592, 593, 594; 358/2.1, 3.23, 3.24, 537

(56) References Cited

U.S. PATENT DOCUMENTS

| | | | |
|---|---|---|---|
| 5,018,085 A | 5/1991 | Smith, Jr. .............. | 345/431 X |
| 5,038,300 A | 8/1991 | Seiler et al. .............. | 345/431 |
| 5,349,452 A | 9/1994 | Maeda et al. .............. | 358/527 |
| 5,475,509 A | 12/1995 | Okamoto .................. | 358/518 |
| 5,502,580 A | 3/1996 | Yoda et al. ................ | 358/518 |
| 5,699,080 A | 12/1997 | Oshiga et al. ........... | 345/145 X |
| 5,761,338 A | 6/1998 | Kasamatsu ................ | 382/176 |
| 5,781,666 A | 7/1998 | Ishizawa .................... | 382/284 |
| 6,044,173 A | 3/2000 | Kumada ..................... | 382/167 |

FOREIGN PATENT DOCUMENTS

| | | | |
|---|---|---|---|
| EP | 0 531 891 A2 | 3/1993 | ............ H04N/1/46 |
| EP | 0565283 | 10/1993 | ............ H04N/1/46 |
| EP | 0 565 283 A1 | 10/1993 | ............ H04N/1/46 |
| JP | 5-336367 | 12/1993 | ............ H04N/1/40 |
| JP | 6-6601 | 1/1994 | ............ H04N/1/40 |
| JP | 6-291998 | 10/1994 | ............ H04N/1/40 |
| JP | 7-154623 | 6/1995 | ............ H04N/1/60 |
| JP | 7-222009 | 8/1995 | ............ H04N/1/60 |
| WO | WO 91-10316 | 7/1991 | ............ H04N/1/46 |
| WO | WO 94-30003 | 12/1994 | ............ H04N/1/46 |

OTHER PUBLICATIONS

L. W. MacDonald et al. "Factors Affecting the Appearance of Coloured Images on a Video Display Monitor", Journal of Photographic Science, vol. 38, 1990, Proceedings Issue, pp. 177–186, XP009041245.

"Fast Color Processor With Programmable Interpolation By Small Memory (PRISM)", K. Kanamori et al., Journal of Electronic Imaging, vol. 2, No. 3, Jul. 1993, US, pp. 213–224 XP000394880.

*Primary Examiner*—Mark Zimmerman
*Assistant Examiner*—Enrique L. Santiago
(74) *Attorney, Agent, or Firm*—Fitzpatrick, Cella, Harper & Scinto

(57) ABSTRACT

An image processing apparatus is constructed by a setting circuit for manually setting a first color processing parameter, a first color processing circuit for performing a first color process by using the first color processing parameter, a storing circuit for storing a second color processing parameter set in correspondence to the first color processing parameter as a reference value, and a second color processing circuit for performing a second color process different from the first color process by using the second color processing parameter, wherein in case of making the second color processing circuit function, the first color processing parameter is set to the reference value.

12 Claims, 14 Drawing Sheets

OBJECTIVE AUTOMATED COLOR MATCHING BETWEEN INPUT AND OUTPUT DEVICES

CROSS REFERENCE TO RELATED APPLICATION

This application is a division of Application Ser. No. 08/724,481, filed Feb. 17, 1998, now U.S. Pat. No. 6,118,455, issued Sep. 12, 2000.

BACKGROUND OF THE INVENTION

1. Field of the Invention

The invention relates to image processing apparatus and method for performing a color process.

2. Related Background Art

In recent years, it has become know that problems exist such that various color reconstructions are performed due to a difference of a coloring mechanism for each input/output device or a difference of a coloring material to be used. This is due to a spread of networks and an enlargement of a demand for a color product and that a color matching function differs for each kind of apparatus. There is a color management system (CMS) which is known as a technique which is highlighted to solve those problems. At present, to solve the problems, a process is executed for matching the colors of input and output images by connecting the system to a computer and performing a data conversion using profile data formed every input/output equipment by using a software (CMS software).

Even if the same signal is inputted, the same color is not always outputted due to a difference of the device. Therefore, information regarding characteristics of input/output signals in input/output equipment which was set in a reference state in order to suppress the characteristics of each device has been stored in the profile data. Input/output characteristics of the signal of the device are distinct by the profile data of each device and by correcting by using the profile data, the colors can be matched irrespective of the device.

The data conversion will now be described with reference to FIG. 13. In the diagram, device characteristics data regarding input equipment has been stored in input equipment profile data 101. Device characteristics data regarding output equipment has been stored in output equipment profile data 107.

A color signal obtained from the input equipment is converted by a data conversion unit 106 by using the input equipment profile data 101. The converted data is a color signal which doesn't depend in each device. In further another data conversion unit 112, the data is converted into a color signal suitable for each output equipment by using the output equipment profile data 107 and is outputted by using such a color signal.

At present, input/output equipment such as monitor, printer, scanner, or the like which is most frequently used has a function for changing the color or brightness in accordance with a taste of the user. The monitor generally has a knob to adjust the brightness and contrast. To obtain a preferable image in consideration of a fatigue of the eyes, the user can adjust the brightness of the monitor by freely moving the knob. In a monitor which can perform a further advanced correction, a formation of a gamma table, a change in color temperature of the monitor, and the like can be performed.

In a manner similar to the above, there is also a printer having the correcting function to obtain a desired color of the user by a method such that an output balance of colors is adjusted, an LUT is formed, or the like.

As mentioned above, when input/output equipment which can be adjusted by the user is used, there occurs a problem such that by the execution of the adjustment by the user, a state of the input/output equipment when the profile data is formed and a state of the equipment when data is actually inputted or outputted are different, so that an accurate color matching cannot be performed.

Such a problem also occurs in the color management system for performing a color matching process according to an illumination light, namely, a color managing technique which has been proposed in recent years.

A construction in the case where an image of an original is read by an image scanner and the read image is displayed on a monitor screen and an ambient light is considered will now be described. FIG. 14 shows a schematic constructional block diagram. An image scanner 510 reads out the image of the original and outputs the read image data in an (R, G, B) form. A scanner color conversion device 512 converts an output signal of an RGB colorimetric system of the scanner 510 into a standard colorimetric system (XYZ colorimetric system) with reference to a scanner profile 514 which has previously been formed from image reading characteristics of the image scanner 510.

A signal conversion device 516 corrects an output of the conversion device 512 in consideration of an ambient light in accordance with ambient color information which is supplied from the ambient light sensor 518 to detect color components or a color distribution of the ambient light.

In accordance with a monitor profile 522 which reflects coloring characteristics of a monitor display (hereinafter, abbreviated to a monitor) 524 to be used, a monitor color conversion device 520 converts the output signal of the XYZ colorimetric system of the signal conversion device 516 into values of an RGB space in consideration of the coloring characteristics of the monitor 524 and supplies the output signal to the monitor 524.

An environment where the image is observed will now be simply explained with reference to FIG. 15. A printed matter (original) 530 is read by the image scanner 510 and the read image is displayed as an image (original image) 532 on the screen of the monitor 524. The illumination light from a fluorescent light or the like illuminates an ambient portion as an ambient light 534. The ambient light sensor 518 is put onto the monitor 524, a printer, or a computer main body and detects a color distribution or color components of the ambient light 534. The original image 532 is generally displayed on the screen of the monitor 524 so as to be overlaid on a background color (color of the screen) 536. Therefore, the user simultaneously looks at both of the background color 536 and the original image 532 and recognizes the color of the original image 532.

The ambient light 534 changes depending on a situation. According to the existing color managing technique, the ambient light 534 is detected by the ambient light sensor 518 and, in accordance with the detection information, the signal conversion device 516 corrects an output of the scanner color conversion device 512, namely, the color signal of the standard colorimetric system. Thus, the coloring of the original image 532 which is displayed on the screen of the monitor 524 is adjusted in accordance with the ambient light. Namely, a colorimetrological coincidence is realized.

Although the colors of the same value on the standard color space inherently ought to be seen as a same color, in the case where both colors are a color of the monitor (light source color) and a color of the printed matter (object color) and even if they have the same value on the standard color space, they cannot be seen as a same color for the human eyes due to a difference of the visual environment, mode, or the like. As for such a problem, the following correcting techniques have also been proposed in order to enable the human being to perceive them as a same color by observing with the eyes.

It is considered that when observing colors, the human being uses white as a reference and recognizes all of the colors by comparing with white. It is now considered a case, as an example, of observing a monitor display image put under a certain ambient light and a printed matter put under the same or a different ambient light. There are a number of white colors which should be reference colors such as white of the monitor screen, white of the environmental light, white of a paper illuminated by the environmental light, and the like. It is possible to regard such that the colors are observed by using a white color adapted to such a number of white colors at a certain ratio as a reference. A method whereby by calculating reference white and converting the colors of all of the image by setting such white as a reference, observation colors are mutually matched is considered. Actually, when reference white is calculated, one adaptation ratio of white of the monitor screen under the fluorescent light to the ambient light is determined and reference white is calculated by using such an adaptation ratio.

As shown in FIG. 15, when observing the original image 532 which is displayed on the screen of the monitor 524, both of the original image 532 and the ambient color (background color) 536 simultaneously enter the eyes. Since human being recognizes the color by a comparison with the circumstances, it is known that if the colors displayed in the center portion are the same and the background colors are different, the colors of different impressions are perceived. Therefore, even in case of displaying the same image, if the background color differs, the color of the display image is recognized as a different color.

SUMMARY OF THE INVENTION

The invention is made in consideration of the above points and it is an object of the invention to realize a highly-accurate color matching.

Particularly, an object of the invention is to enable an effect of a preset color process to be most efficiently derived.

To accomplish the above object, according to the invention, there is provided an image processing apparatus comprising: setting means for manually setting a first color processing parameter; first color processing means for performing a first color process by using the first color processing parameter; storing means for storing a second color processing parameter which has been set in correspondence to the first color processing parameter as a reference value; and second color processing means for performing a second color process different from the first color process by using the second color processing parameter, wherein when the second color processing means is made to function, the first color processing parameter is set to the reference value.

Another object of the invention is to provide a highly-accurate color matching on the basis of an application of the user.

To accomplish the above object, according to the invention, there is provided an image processing apparatus having first and second color matching modes for performing different color matching processes, comprising: selecting means for selecting the color matching mode on the basis of an instruction of the user; and setting means for setting a background color on a display screen to a predetermined color when the second color matching mode is selected by the selecting means.

The above and other objects and features of the present invention will become apparent from the following detailed description and the appended claims with reference to the accompanying drawings.

DETAILED DESCRIPTION OF THE PREFERRED EMBODIMENTS

Embodiments according to the invention will now be described hereinbelow with reference to the drawings.
[Embodiment 1]

Embodiment 1 relates to an example when the invention is applied to an image processing apparatus having an input unit, an output unit, and a color matching processing function.

According to a color matching process, a data conversion is executed so as to equalize a color reconstruction irrespective of a device on the basis of input/output profiles showing input/output characteristics which are different for every input/output device.

Figure 1:
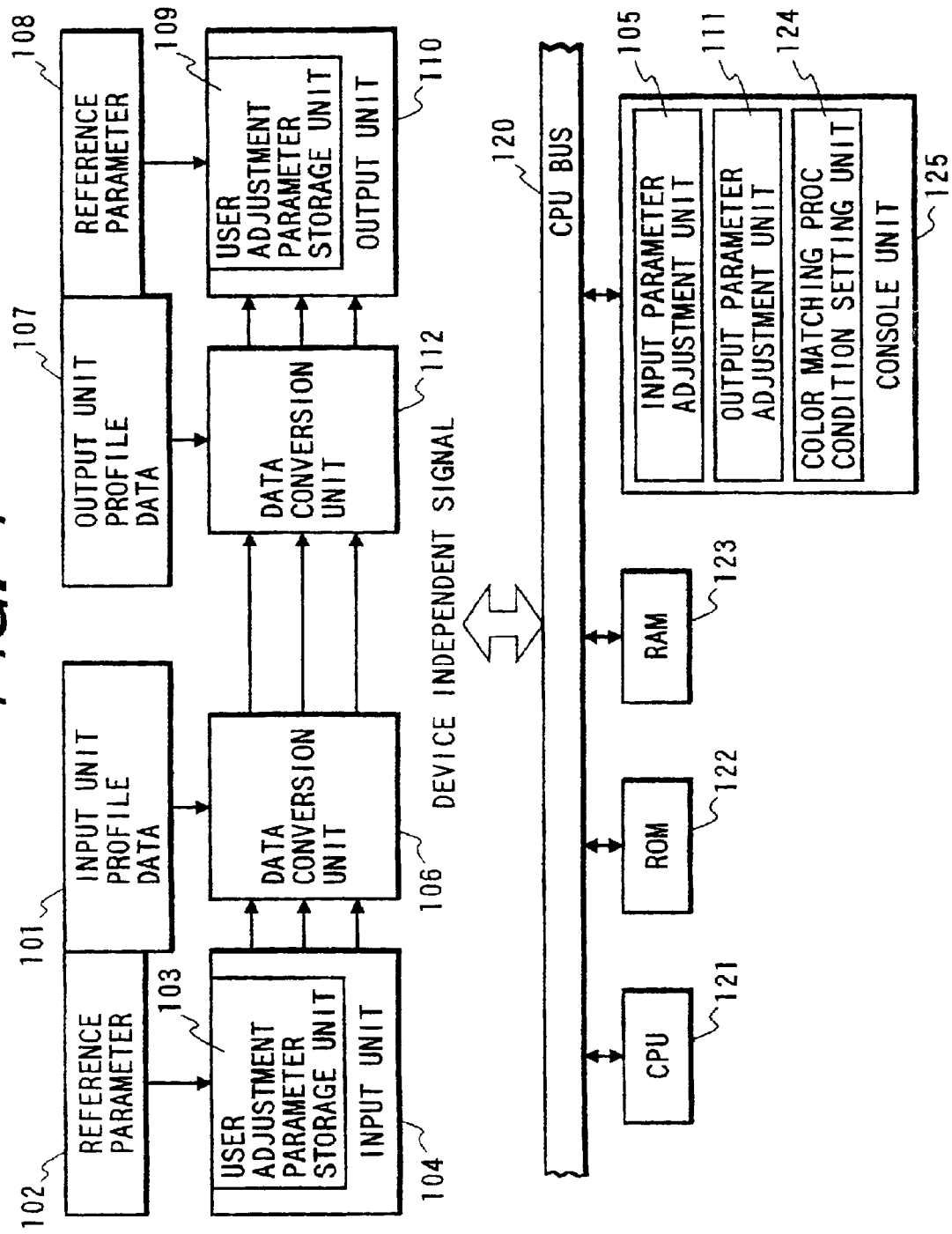
FIG. 1 is a block diagram regarding an image processing apparatus according to embodiment 1.

FIG. 1 shows a block diagram of the image processing apparatus according to embodiment 1.

Information regarding characteristics of input/output signals in each input/output device which was set into a reference state has been stored in profile data of the input unit and output unit.

Further, a parameter regarding the reference state of an input unit 104 at the time of formation of the input unit profile is added as a reference parameter 102 to the input equipment profile data. Similarly, a reference parameter 108 at the time of the formation of an output equipment profile is added to the output equipment profile data. For example, in case of a monitor which is used as input/output equipment, parameters regarding an image adjustment such as gamma characteristics, contrast, brightness, color temperature of white, and the like have been stored in the reference parameter.

As an example of a method of forming the profile data, in case of a printer, first, the apparatus is set to a reference state and a reference sample in which a certain known input signal is outputted and color characteristics of the outputted sample are measured. The relation of the input/output signals is stored as profile data.

Device characteristics data regarding the input unit 104 has been stored in the input equipment profile data 101. Device characteristics data regarding an output unit 110 has been stored in the output equipment profile data 107.

User adjustment parameter storage units 103 and 109 exist in the input/output units and parameters regarding the image adjustment including values which were freely set by the user by using knobs, menu bars, and the like provided for a user adjustment unit 105 and output parameter adjustment unit 111 have been stored in the storage units 103 and 109.

When the input unit or output unit is solely used without using CMS software, ordinarily, an image is inputted or outputted by using the parameters stored in the user adjustment parameter storage units.

However, when the color matching process is executed, in order to realize a color reconstruction of high quality, it is necessary to set a reference state when each profile data is formed.

Namely, it is necessary to set the parameters of the input/output units in correspondence to the input/output profile data.

For this purpose, which one of the user adjustment parameter 103 and the reference parameter 102 at the time of the formation of the input equipment profile should be used needs to be decided by a color matching processing condition setting unit 124 in accordance with the input/output environment of the image.

A flow of processes according to embodiment 1 will now be described hereinbelow with reference to FIG. 2.

First, whether or not the color matching process is executed is set by the color matching processing condition setting unit 124 in a console unit 125 (S10).

When the color matching process is executed, the processing parameters in the input unit 104 and output unit 110 are set to the reference values when the profiles are formed (S20).

An inputting process is executed on the basis of the reference values set in the input unit 104, thereby obtaining input image data (S30).

As mentioned above even if the user adjustment parameters are used, in case of matching the colors of input and output images by using the color matching process, the reference parameter 102 which has previously been added to the input equipment profile data is used in place of the user adjustment parameter 103. At this time, the user adjustment parameters are rewritten and the control of the input unit can be performed or the control of the input unit can also be directly performed by using the reference parameter irrespective of the user adjustment parameters. As mentioned above, the input image data is obtained by the input equipment set in the reference state.

In the data conversion unit 106, the input image data is subjected to a data conversion process 1 for converting into data (device independent signal) which doesn't depend on the device on the basis of the input equipment profile data 101 (S40).

In the data conversion unit 112, a data conversion process 2 for converting into output image data suitable for an output device is executed on the basis of the output equipment profile data 107 (S50).

Namely, in the data conversion process 1, the input image data depending on the input unit is converted into the device independent data by using the input equipment profile data. In the data conversion process 2, the device independent data is converted into output image data which depends on the output unit by using the output equipment profile data.

In a manner similar to the input unit, even if the user adjustment parameters have been set, in case of matching the colors of the input and output images by using the color matching process, the reference parameter 108 which has previously been added to the output equipment profile data and has been set in step S20 is used in place of the user adjustment parameters 109, thereby obtaining output image data from the output unit 110 set in the reference state.

On the other hand, when a mode such that the color matching process is not executed is set in step S10, the parameters of the input unit and output unit are arbitrarily manually set in accordance with an application of the user by using the user adjustment unit 105 and output parameter adjustment unit 111 of a console unit 25 (S70).

When the parameters of the input unit and output unit have been preset in accordance with the application of the user, those parameters can also be used.

An input process is executed in the input unit and an output process is executed in the output unit in accordance with the set parameters (S80 and S90).

Each unit of the image processing apparatus is controlled by a CPU 121 connected through a CPU bus 120.

Figure 2:
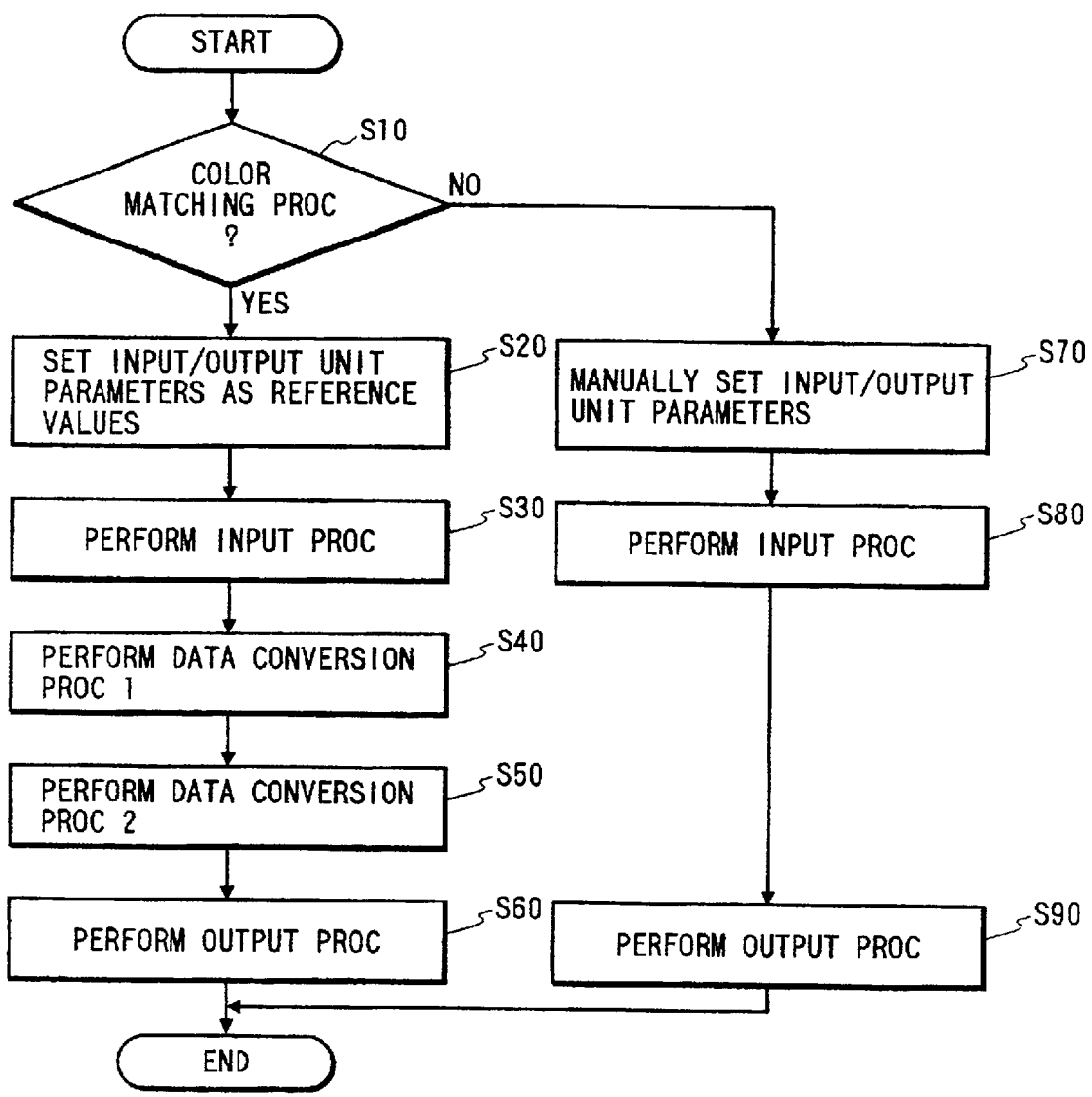
FIG. 2 is a flowchart for image processes according to embodiment 1.

The CPU 121 controls each of the above units by using a RAM 123, as a work memory, on the basis of, for example, a program to execute processes shown in FIG. 2 stored in a ROM 122 in accordance with the setting of the console unit 125.

According to embodiment 1, when the color matching process is executed, since the input and output processes are executed in the input/output units by parameters suitable for the input/output equipment profiles which are used for the color matching processes which are executed by the data conversion units 106 and 112, an effect of the CMS process can be most efficiently derived.

That is, the colors can be matched irrespective of the input/output devices.

When the color matching process is not executed, an arbitrary process can be performed on the basis of a a choice by the user.

[Modification 1]

Figure 3:
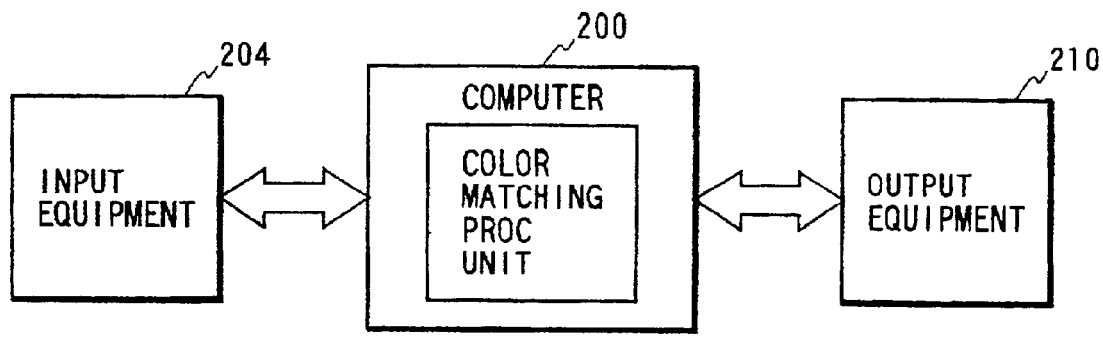
FIG. 3 is a constructional diagram of an image processing system according to embodiment 2.

As a modification, an example in which the invention is applied to an image processing system as shown in FIG. 3 will now be described.

The image processing system is constructed by: input equipment 204 and output equipment 210 corresponding to the input unit 104 and output unit 105 in the embodiment 1; and a computer 200 for performing the color matching process.

Figure 4:
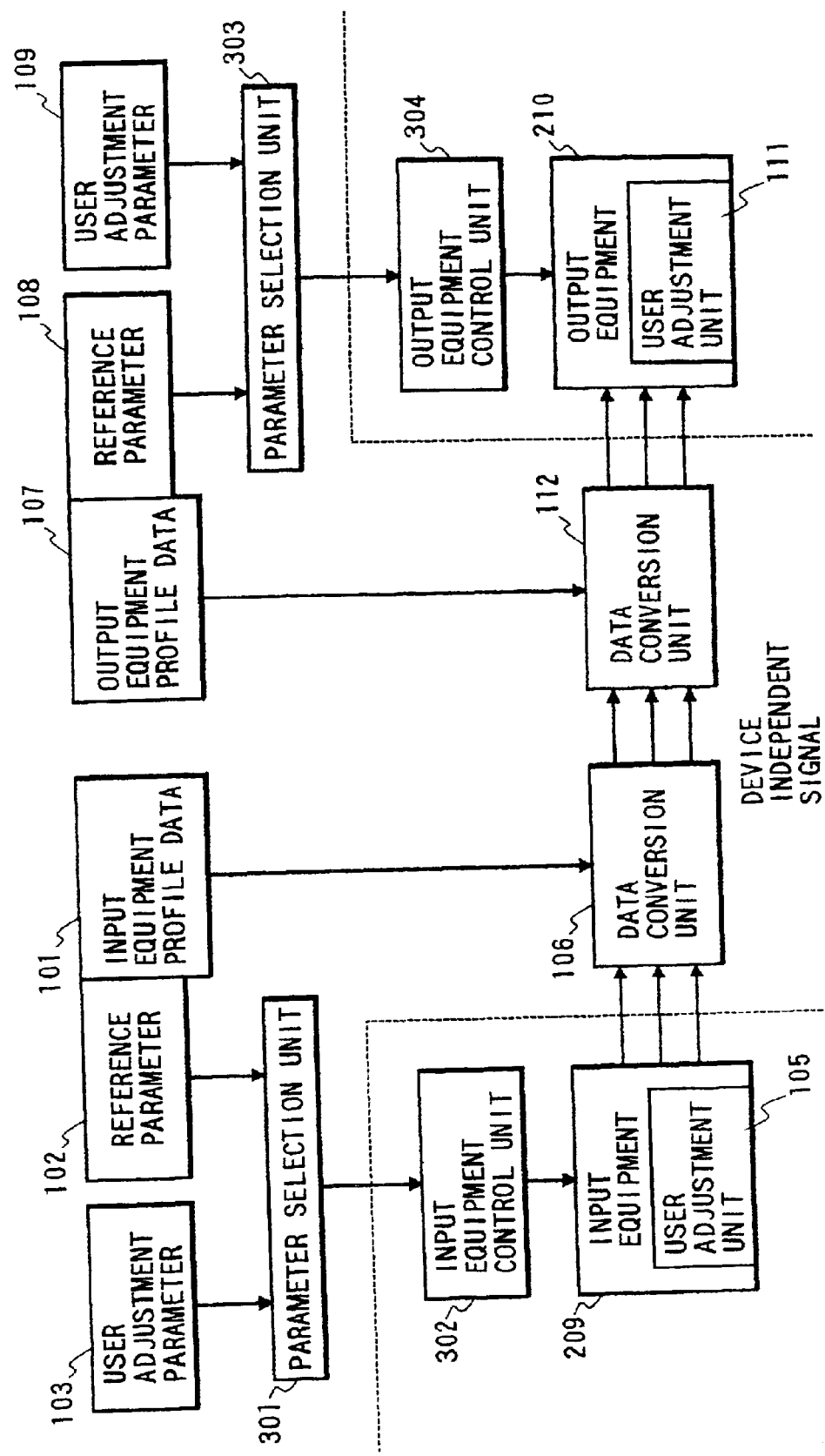
FIG. 4 is a block diagram showing an example of an image processing system according to a modification of embodiment 1.

An example in the case where the user adjustment parameters exist in a memory of the computer for controlling instead of the input/output equipment will now be described hereinbelow with reference to FIG. 4.

Portions similar to those in embodiment 1 are designated by the same reference numerals.

In a manner similar to embodiment 1, when an image is inputted, whether the user adjustment parameters 103 are used or the parameters are set to the reference parameter 102 when each profile is formed is first determined in accordance with input/output environment of the image. Both of the user adjustment parameters and the reference parameter have been stored in the memory of the computer for controlling. When the colors of the input and output images are matched by a CMS (color management system) software, in a parameter selection unit 301, the reference parameter 102 added to the input equipment profile data is selected. On the basis of the selected parameter, the input equipment is set into the reference state by an input equipment control unit 302. In the other case where the CMS software is not used, the user adjustment parameters 103 adjusted by the user are selected and the input equipment 204 is controlled by using the user adjustment parameters. Image data is obtained by such input equipment.

Even in the data conversion, a conversion similar to that in embodiment 1 is executed. The control of the output equipment is also substantially the same as that for the input equipment. Either one of the user adjustment parameters 109 and reference parameter 108 is selected in accordance with the input/output environment of the image. An output image is derived from output equipment 210 controlled by using the selected parameter.

Figure 5:
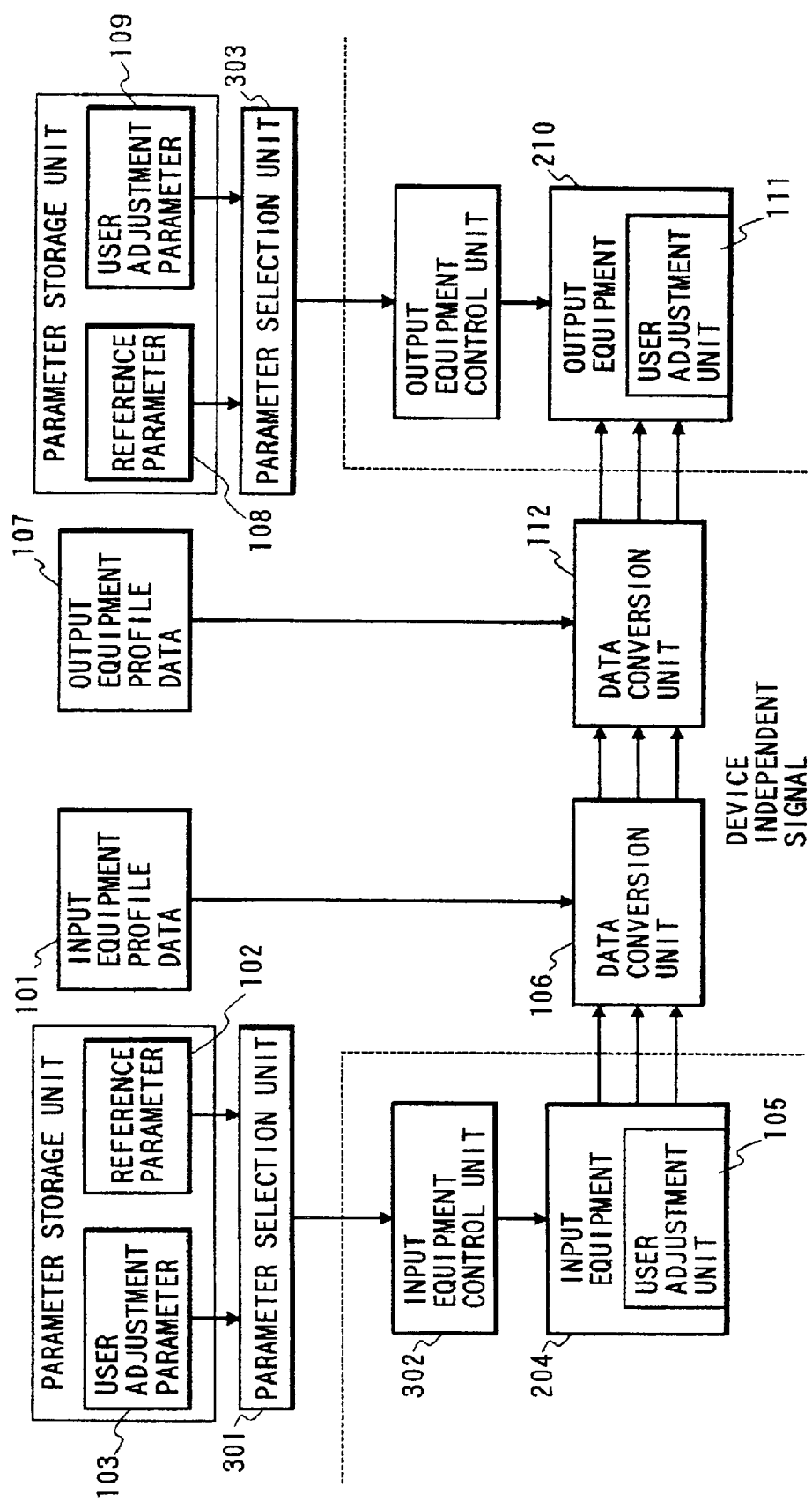
FIG. 5 is a block diagram showing an example of an image processing system according to a modification of embodiment 1.

In the image processing system shown in FIG. 3, the reference parameter has been added to the input/output equipment profile data. However, as shown in FIG. 5, both of the user adjustment parameters 103 and 109 and the reference parameters 102 and 108 can also be stored into parameter storage units 401 and 402 of the input/output equipment by disconnecting from the input/output equipment profile data, respectively. It is also possible to arbitrarily select both of them in accordance with the input/output environment and to obtain an image by the input/output equipment controlled by the selected data.

Although the storing locations of the data have been limited in the above embodiment, the invention is not limited to the example as shown in the embodiment but the invention can also be sufficiently applied to a combination of them or a case where the storing positions of the user adjustment parameters and a reference parameter are other than the locations mentioned in the embodiment.

That is, the user adjustment parameters can also be stored in the input/output equipment main bodies.

[Embodiment 2]

In the foregoing embodiment 1, when the color matching processing mode is set, the user cannot set a user processing parameter.

Therefore, for example, when the user wants to finely adjust the image generated by the color matching process, the user has to set an ordinary mode in which the color matching process is not executed and to set parameters from the beginning.

In embodiment 2, an example in which an image can be finely adjusted for a color matching processing result will now be described with reference to FIG. 6.

Figure 6:
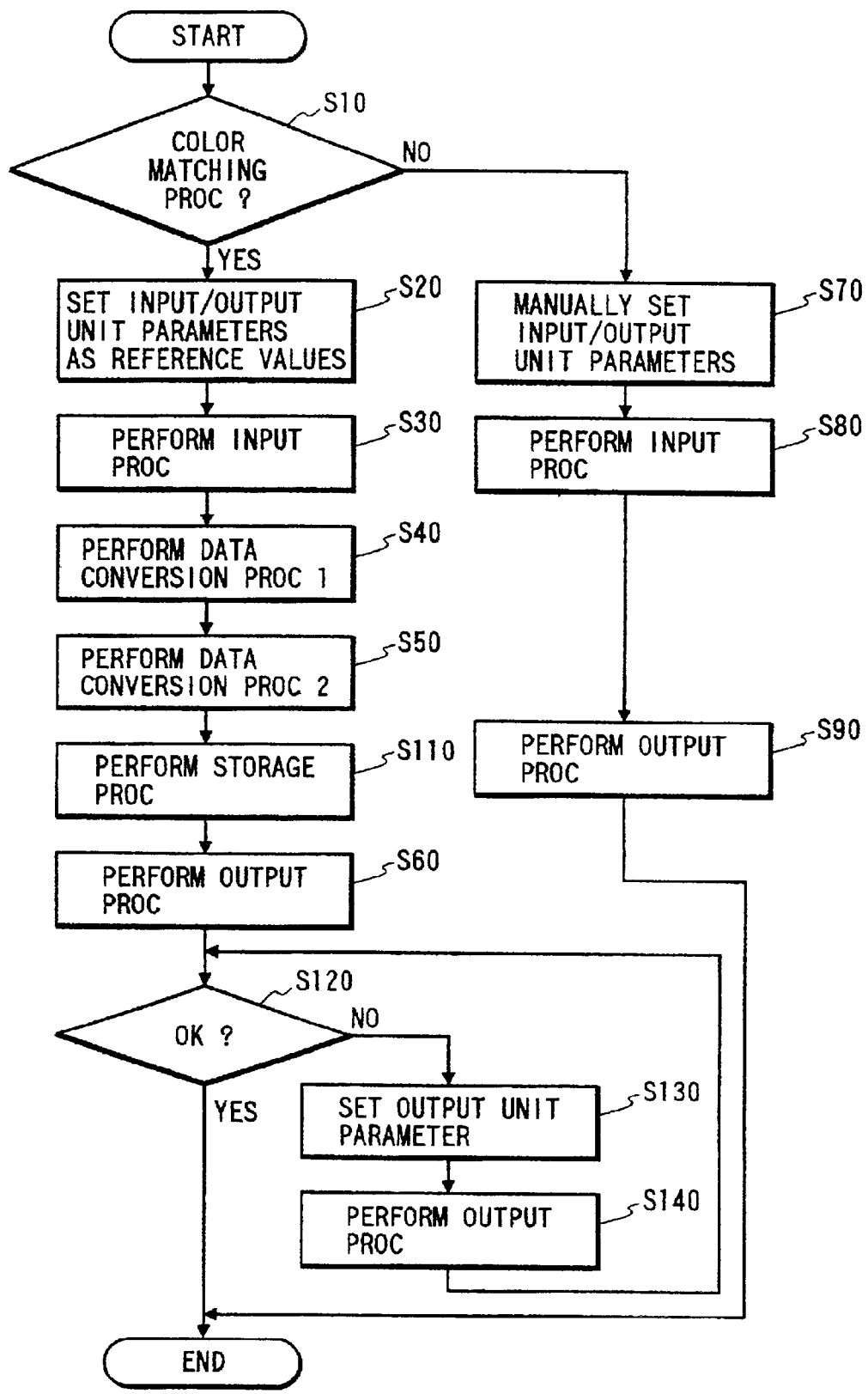
FIG. 6 is a flowchart for image processes according to embodiment 2.

In FIG. 6, substantially the same processing steps as those in the embodiment 1 are designated by the same processing step numbers and their descriptions are omitted.

In FIG. 6, processes in steps S110 to S160 are added to the processes in the embodiment 1 in order to perform the fine adjustment mentioned above.

When the CMS processing mode is set in step S20, the color matching process (S10 to S50) is executed in a manner similar to embodiment 1 and the image data which was color matching processed is stored into the RAM 123.

An image is outputted by using the reference parameter by the output unit 110.

Whether or not the output image is satisfactory is confirmed by the eyes (S120).

When the user is satisfied with the output image, the processing routine is finished.

On the other hand, when the user cannot satisfy the output image, in order to perform the fine adjustment, the parameters of the output unit are set by using the output parameter adjustment unit 111 (S130).

The image data which was CMS processed and stored in the RAM 123 is read out and an image is outputted by using the set parameters (S140).

The processes in steps S120 to S140 are repeated until a satisfactory output image can be obtained.

Each of the above embodiments has been shown and described on the assumption that, as for the selection between the user adjustment parameters and the reference parameter, when the color of the image is controlled by the CMS software, the reference parameter is selected and, in the other cases, the user adjustment parameters are used. However, it is also possible to automatically select the parameters or to arbitrarily select either one of those parameters in accordance with a desire of the user case by case.

Further, although the case where the number of reference parameters when the profile is formed is set to one parameter has been shown above, it is also possible to construct in a manner such that there are a plurality of reference parameters corresponding to the user adjustment values and a reference parameter at the time of control is newly formed as interpolation data of them.

Although the embodiments have been described above with respect to the input/output equipment, the invention can also be applied to any other various combinations such as (scanner and monitor), (monitor and printer), and the like as a combination of the input/output equipment.

[Embodiment 3]

The embodiment 3 of the invention will now be described in detail hereinbelow with reference to the drawings.

Figure 7:
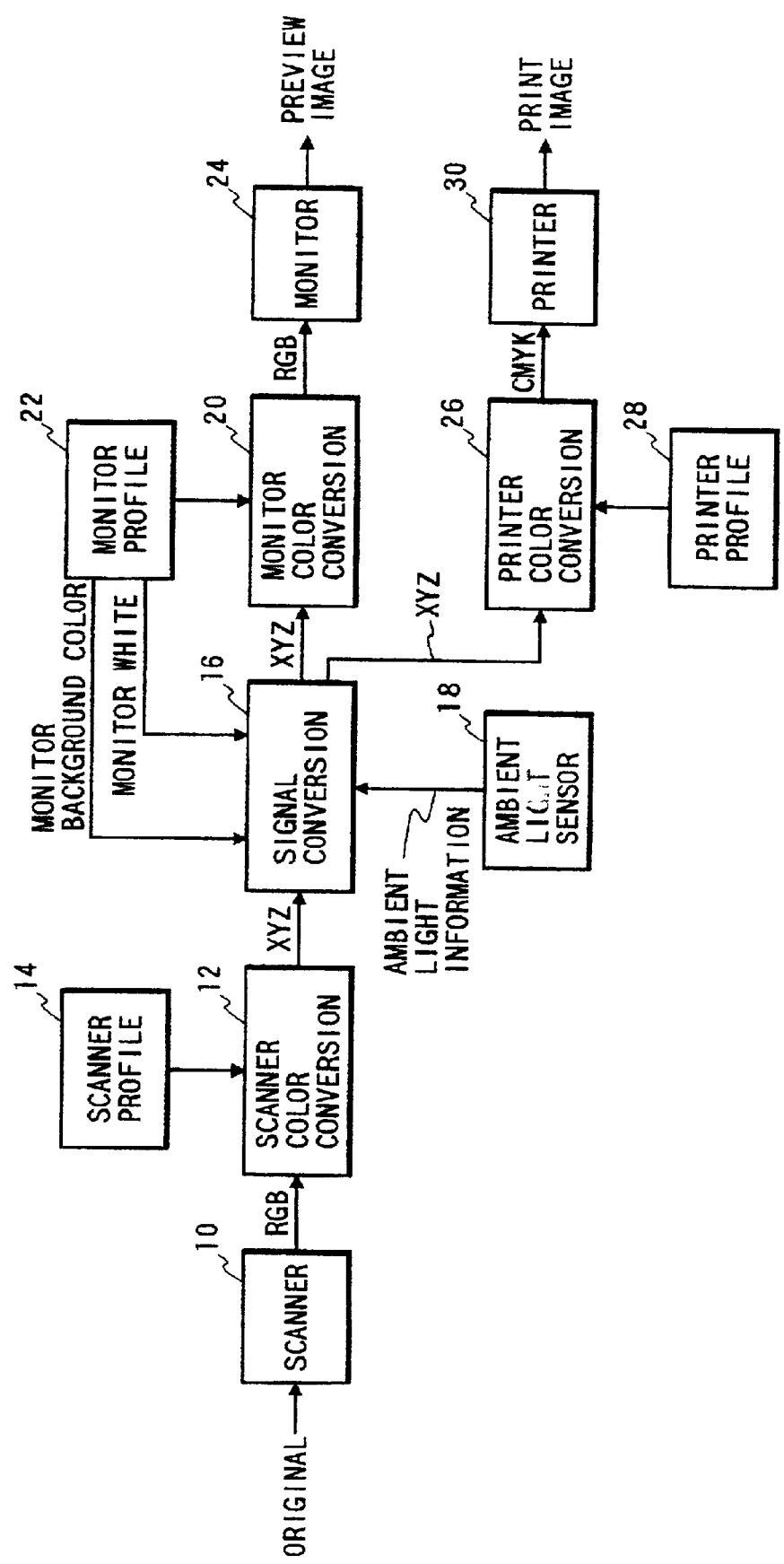
FIG. 7 is a schematic constructional block diagram of an image processing apparatus according to embodiment 3.
Figure 8:
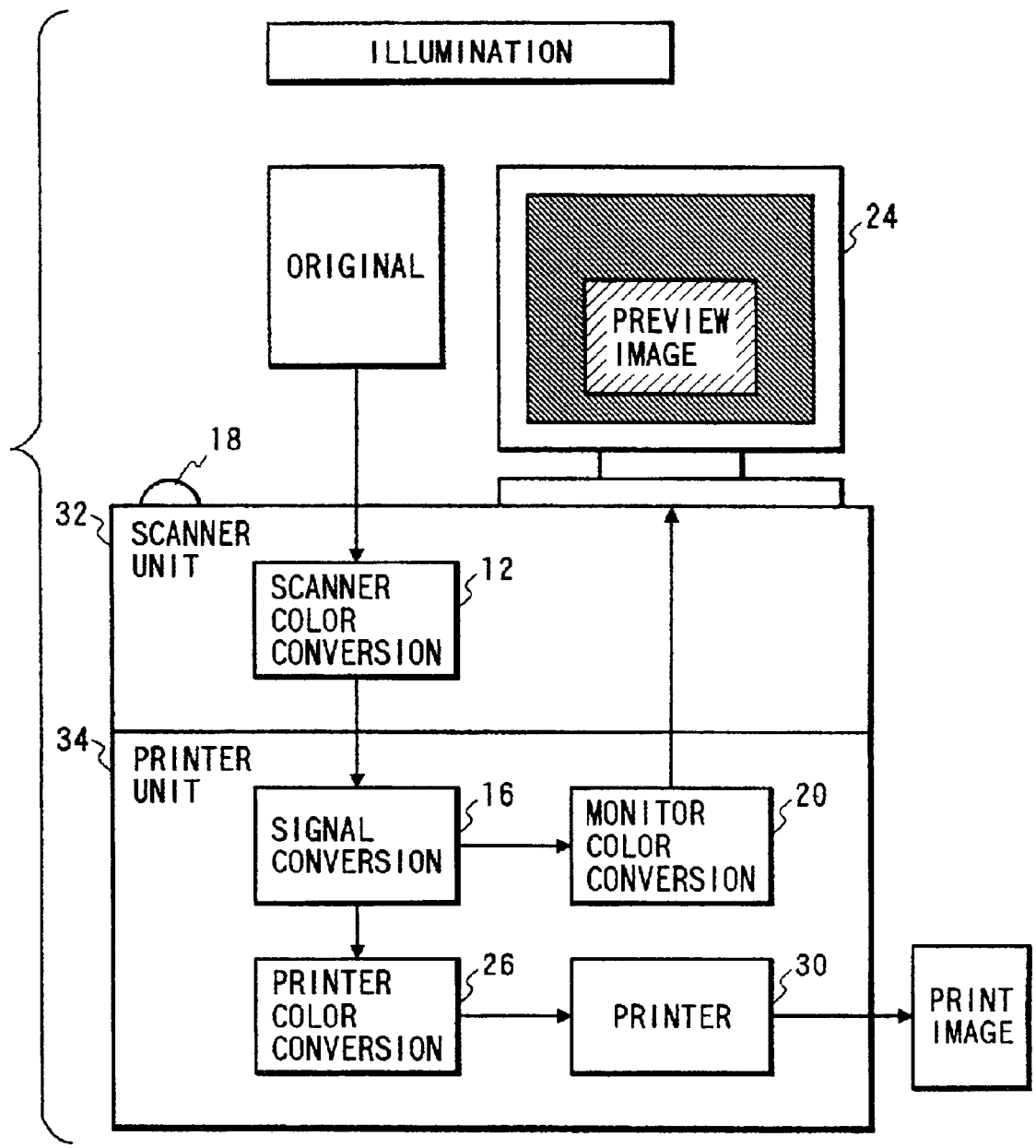
FIG. 8 is a schematic diagram showing an arrangement of blocks in the embodiment shown in FIG. 7.

Embodiment 3 of the invention applied to a copying apparatus with a monitor for displaying an original image and a previewer having functions for a selection of an output portion, an edition of a color, and the like on a monitor screen will now be described. FIG. 7 shows a schematic constructional block diagram of such a copying apparatus. FIG. 8 shows a schematic block diagram showing an arrangement of functional blocks in FIG. 7. The same component elements in FIGS. 7 and 8 are designated by the same reference numerals.

An image of an original is read by the image scanner 10. The image scanner 10 outputs the read image data as an RGB signal. The scanner color conversion device 12 converts the output signal of the RGB colorimetric system (color system) of the scanner 10 into values of the XYZ colorimetric system in consideration of the reading characteristics of the image scanner 10 in accordance with the scanner profile 14 which has been prepared in accordance with the reading characteristics of the image scanner 10. An output of the color conversion device 12 is a standard color signal which doesn't depend on the image input device. It will be obviously understood that the standard color space is not limited to the XYZ colorimetric system and another arbitrary colorimetric system can be used so long as it can absorb a device dependence.

Data regarding the color characteristics of the scanner 10 has been stored in the scanner profile 14. Specifically speaking, a color conversion matrix from RGB to XYZ or a lookup table (LUT) has been stored.

The signal conversion device 16 corrects an output of the conversion device 12 in accordance with ambient color information which is supplied from the ambient light sensor 18 for detecting color components or a color distribution of the ambient light and white information and information of a background color of the monitor 24 to display the read image. In the embodiment, the white information and the information of the background color of the monitor 24 are supplied from the monitor profile 22 having the coloring characteristics of the monitor 24.

In accordance with the coloring characteristics information from the monitor profile 22, the monitor color conversion device 20 converts the output signal of the XYZ colorimetric system of the signal conversion device 16 into the RGB values in consideration of the coloring characteristics of the monitor 24 and supplies the output signal to the monitor 24. The monitor 24 displays the image of the original as a preview image.

Data regarding the coloring characteristics of the monitor 24, specifically speaking, a color temperature and a light emission luminance of the monitor 24, a chromaticity value of a fluorescent material, color conversion information from the standard color space to the device dependence color signal, and the like have been stored in the monitor profile 22. The monitor background color information which is supplied from the monitor profile 22 to the signal conversion device 16 includes background color information which is at present displayed by the monitor 24 and the background color information when the monitor profile 22 is formed.

In accordance with the characteristics information from a printer profile 28 having coloring characteristics of the printer 30, the printer color conversion device 26 converts the output signal of the XYZ colorimetric system of the signal conversion device 16 into a CMYK signal in consideration of the coloring characteristics of the printer 30 and supplies the output signal to the printer 30. The printer 30 prints and outputs the image of the original onto a recording paper in accordance with the color signal from a color conversion device 26.

As shown in FIG. 8, the scanner color conversion device 12 is enclosed in a scanner unit 32. The signal conversion device 16, monitor color conversion device 20, printer color conversion device 26, and printer 30 are enclosed in a printer unit 34. The monitor 24 is put on an upper portion of the scanner unit 32. The ambient light sensor 18 is arranged beside the monitor 24.

Figure 9:
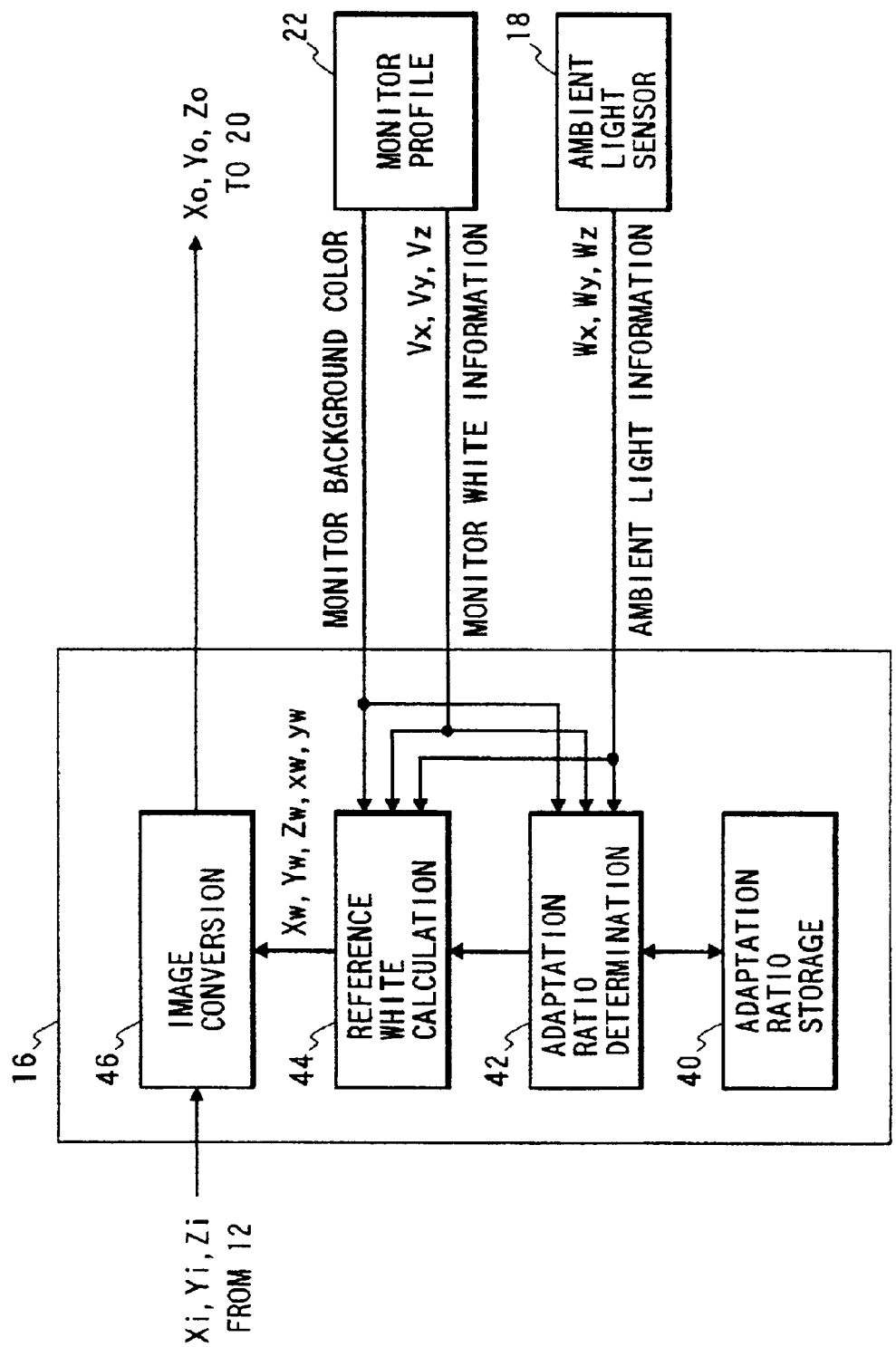
FIG. 9 is a schematic constructional block diagram in a signal conversion device 16.

FIG. 9 shows a schematic constructional block diagram in the signal conversion device 16. Adaptation ratios corresponding to one or two or more environments which are presumed in the case where the ambient light is a predetermined standard light source (A, C, D93, D65, D50, F, etc.) have been stored in an adaptation ratio storage 40. An adaptation ratio also corresponding to a background color (for example, gray scale) when an image is seen has also been stored in the adaptation ratio storage 40. An adaptation ratio determination device 42 selects the adaptation ratios corresponding to the present ambient light and the background color of the monitor from the adaptation ratio storage 40 in accordance with the ambient light information from the ambient light sensor 18 and the monitor white information and the monitor background color information from the monitor profile 22 and supplies them to a reference white calculation device 44.

The reference white calculation device 44 calculates reference white suitable for the ambient light and an observation environment such as color temperature, background color, and the like of the monitor 24 in accordance with the adaptation ratios from the adaptation ratio determination device 42, the ambient light information from the ambient light sensor 18, and the monitor white information and monitor background color information from the monitor profile 22. Its calculating method will be described in detail hereinlater.

An image conversion device 46 converts signals (Xi, Yi, Zi) from the scanner color conversion device 12 in accordance with reference white (Xw, Yw, Zw, xw, yw) calculated by the reference white calculation device 44 and generates signals (Xo, Yo, Zo) of the XYZ colorimetric system.

Figure 10:
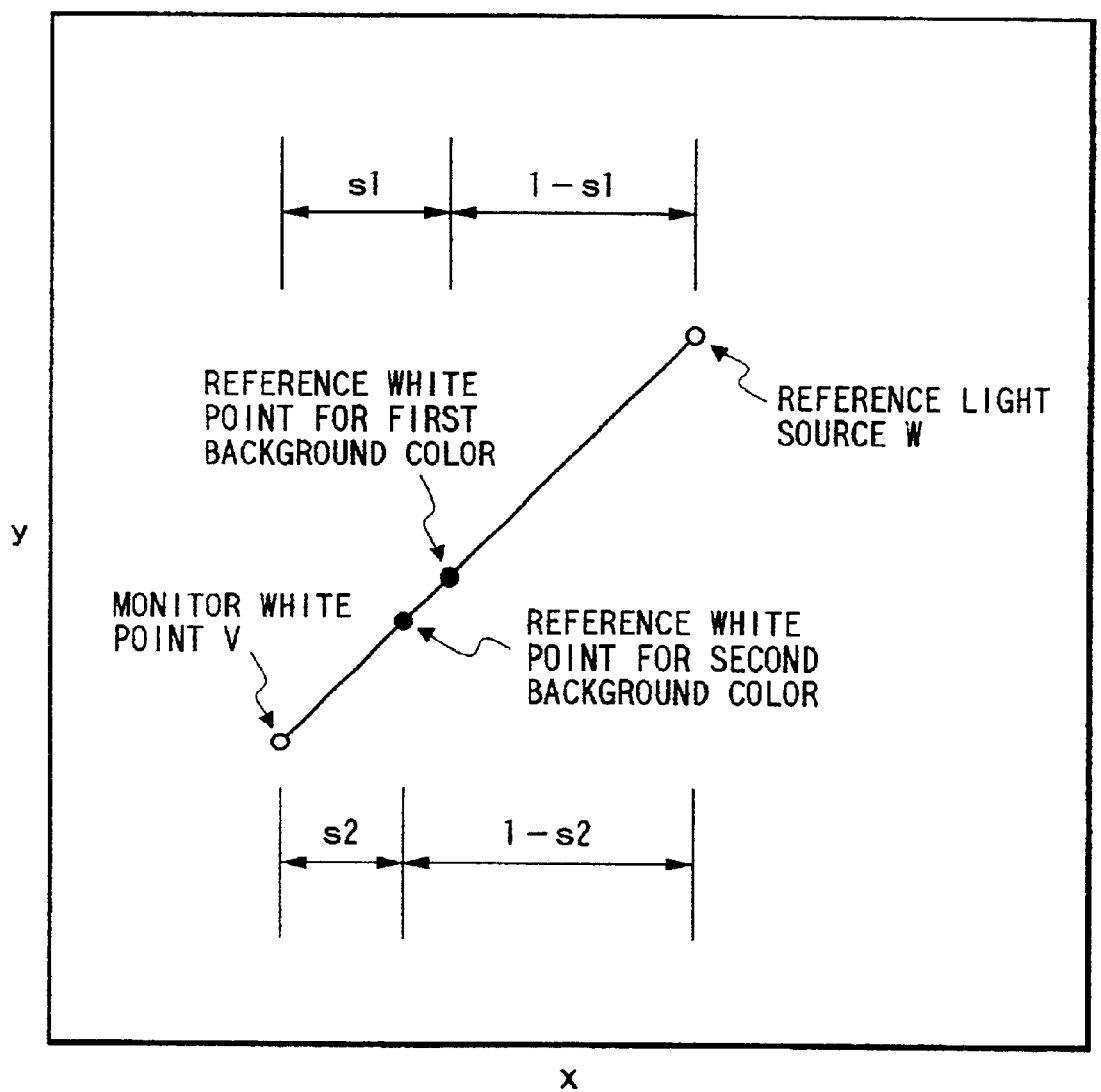
FIG. 10 is a schematic diagram showing the relations among an ambient light, white and a background color of a monitor, and reference white.

FIG. 10 is a schematic diagram showing the relation among the ambient light, white and background color of the monitor, and reference white. The ambient light is based on the reference light source. FIG. 10 shows reference white colors as an example with respect to two background colors. An output of the ambient light sensor 18 can be any one of the spectral data, color signals of XYZ, RGB, or the like, and manual input of those color signals. In FIG. 10, the ambient light information is shown as a reference light source W. The monitor white information from the monitor profile 22 is the color temperature, luminance value, chromaticity value, etc. and is shown as a monitor white point V in FIG. 10.

As described above, when observing the image which is displayed on the monitor screen, it is considered that the human being isn't perfectly adaptive to only monitor white but is adaptive to both of monitor white and the ambient light at a certain ratio. As shown in FIG. 10, therefore, reference white serving as a color observing reference is located between monitor white and the ambient light (reference light source). It is now assumed that an adaptation ratio to monitor white is set to s, an adaptation ratio to the ambient light is set to 1−s, the ambient light information which is obtained from the ambient light sensor 18 is set to Wx, Wy, Wz, wx and wy, monitor white signals which are obtained from the monitor profile 22 are set to Vx, Vy, Vz, vx, and vy, and reference white signals to be calculated are set to Xw, Yw, Zw, xw, and yw, respectively. Thus, Xw, Yw, Zw, xw, and yw can be calculated by the following equations (1) and (2). Namely, with regard to three stimulus values, $$Xw=(1-s) \cdot Wx + s \cdot Vx$$
$$Yw=(1-s) \cdot Wy + s \cdot Vy$$
$$Zw=(1-s) \cdot Wz + s \cdot Vz \qquad (1)$$

With regard to the chromaticity values, $$xw=(1-s) \cdot wx + s \cdot vx$$
$$yw=(1-s) \cdot wy + s \cdot vy \qquad (2)$$

Since s depends on the ambient light at the time of the image observation and the background color of the monitor 24, the adaptation ratio (s:1−s) changes depending on the ambient light and the background color of the image. In association with it, the reference white point also changes every ambient light and background color. For example, when the background color is changed from black to white at a gray scale level, as the background color approaches black, the adaptation ratio to the ambient light increases irrespective of the color temperature of the monitor 24 and ambient light.

It is, therefore, necessary to decide the adaptation ratio in accordance with not only the ambient light but also the background color to be observed. In the embodiment, by deciding as mentioned above, the optimum reference white point is calculated.

A method of converting the whole image on the basis of the reference white signal calculated in this manner will now be described.

The image which is displayed on the monitor screen is observed on the basis of reference white calculated as mentioned above. On the other hand, the printed matter is adaptive to white of the paper or white of the ambient light. It is now assumed that the reference white is set to Xw, Yw, and Zw, white of the ambient light is set to Wx, Wy, and Wz, the image signals (input signals of the image conversion device) which are inputted from the scanner color conversion device 12 to the signal conversion device 16 are set to Xi, Yi, and Zi, and the image signals which are outputted from the image conversion device 46 of the signal converting apparatus are set to Xo, Yo, and Zo. The following equation (3) as a modification of Von Kreis's equation is satisfied. Namely, $$\begin{pmatrix} Xo/Xw \\ Yo/Yw \\ Zo/Zw \end{pmatrix} = \begin{pmatrix} Xi/Wx \\ Yi/Wy \\ Zi/Wz \end{pmatrix} \qquad (3)$$

By modifying the equation (3), the following equation (4) is obtained.

$$\begin{pmatrix} Xo \\ Yo \\ Zo \end{pmatrix} = \begin{pmatrix} Xi \\ Yi \\ Zi \end{pmatrix} \begin{pmatrix} Xw/Wx \\ Yw/Wy \\ Zw/Wz \end{pmatrix} \qquad (4)$$

The following equation (5) can be also used by also including the contrast conversion of the image in consideration of the visual sense characteristics of the human being into the equation (4). Namely, $$\begin{pmatrix} Xo/Xw \\ Yo/Yw \\ Zo/Zw \end{pmatrix} = \begin{pmatrix} Xi/Wx \\ Yi/Wy \\ Zi/Wz \end{pmatrix}^{\gamma} \qquad (5)$$

By modifying the equation (5), $$\begin{pmatrix} Xo \\ Yo \\ Zo \end{pmatrix} = \begin{pmatrix} Xi/Wx \\ Yi/Wy \\ Zi/Wz \end{pmatrix}^{\gamma} \begin{pmatrix} Xw \\ Yw \\ Zw \end{pmatrix} \qquad (6)$$

The monitor color conversion device 20 converts the image signals Xo, Yo, and Zo obtained as mentioned above from the XYZ colorimetric system to the RGB colorimetric system in accordance with the conversion information from the monitor profile 22.

By such a color matching process, color tones of a source image and an output image can be matched. Particularly, by obtaining the reference white signal also in consideration of the background color, a good color matching process can be performed.

In the above embodiment, when the adaptation ratio (s:1−s) or s is decided, the adaptation ratio has been changed in accordance with both of the ambient light and the background color. However, the adaptation ratio can be also set in accordance with the observation environment such as color temperature of the monitor, reflected light from the monitor, or the like.

Figure 11:
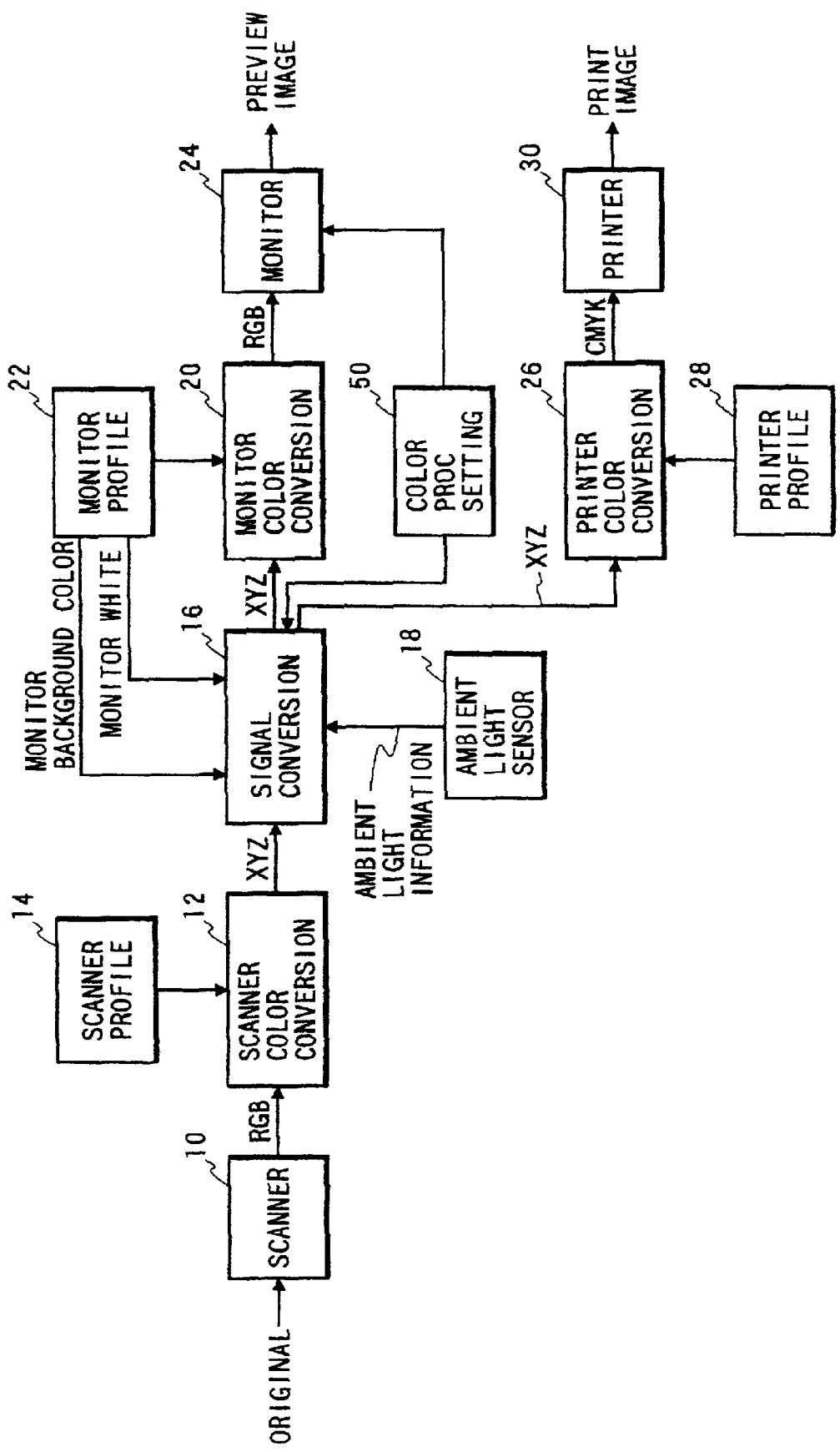
FIG. 11 is a schematic constructional block diagram of a modification.

FIG. 11 shows a schematic constructional block diagram of a modification of the above embodiment. In the modification, the user can select the setting of a color process. Specifically speaking, in case of performing the color process at a high precision, a predetermined background color is displayed on the monitor 24 and both of the display image and the background color, namely, the whole screen of the monitor 24 is controlled, thereby more accurately matching the original image to be displayed on the monitor 24 and the original image which is seen. Reference numeral 50 denotes a color processing setting device to set a color processing method. There is a mode to use the present background color of the monitor 24 as is and a mode to display a specific background color which has previously been selected. The user selects the latter mode when he wants to perform a color management at a high accuracy.

Figure 12:
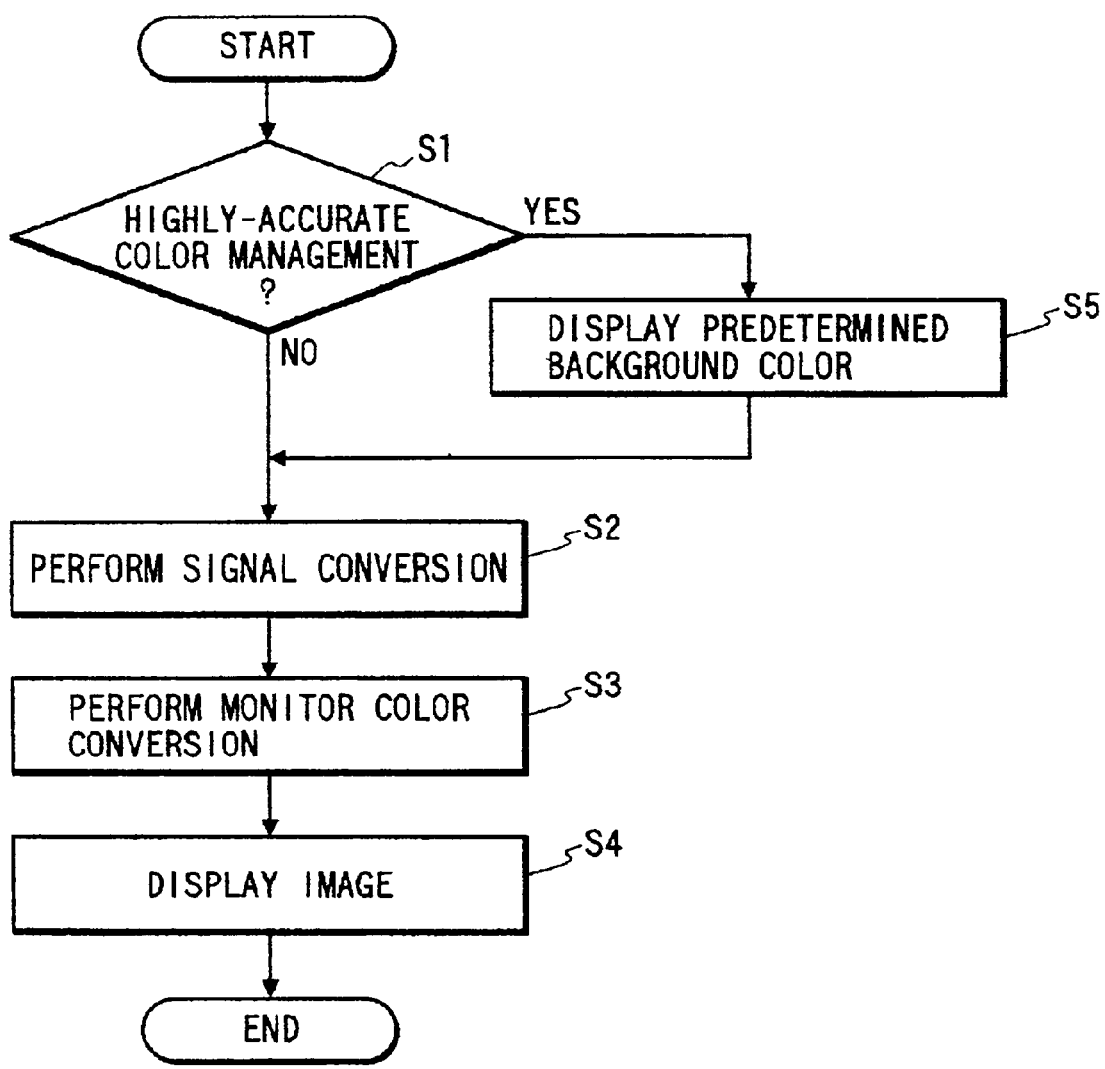
FIG. 12 is an operating flowchart for the modification shown in FIG. 11.
Figure 13:
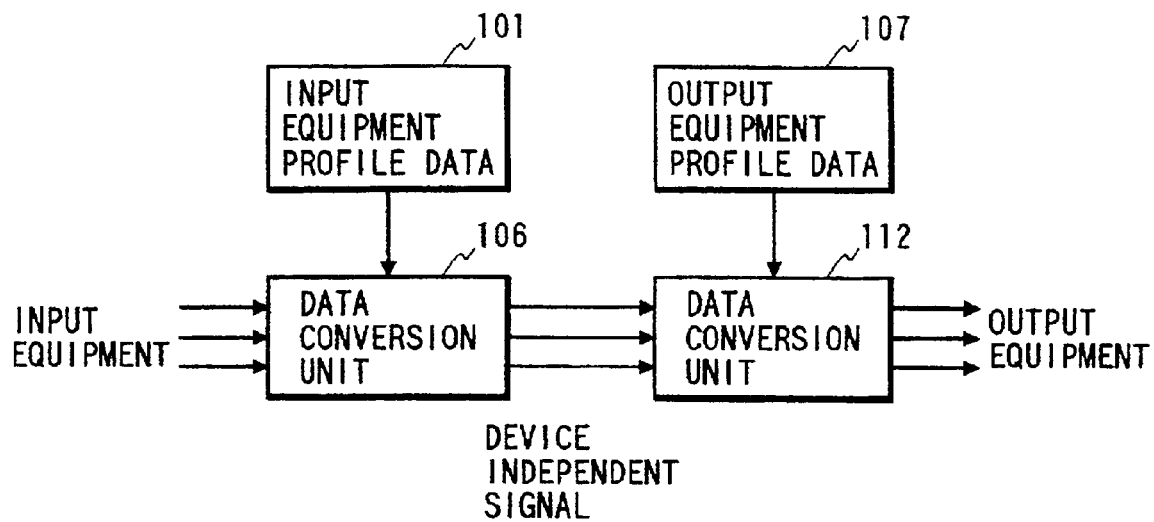
FIG. 13 is a block diagram of an image processing apparatus according to the prior art.
Figure 15:
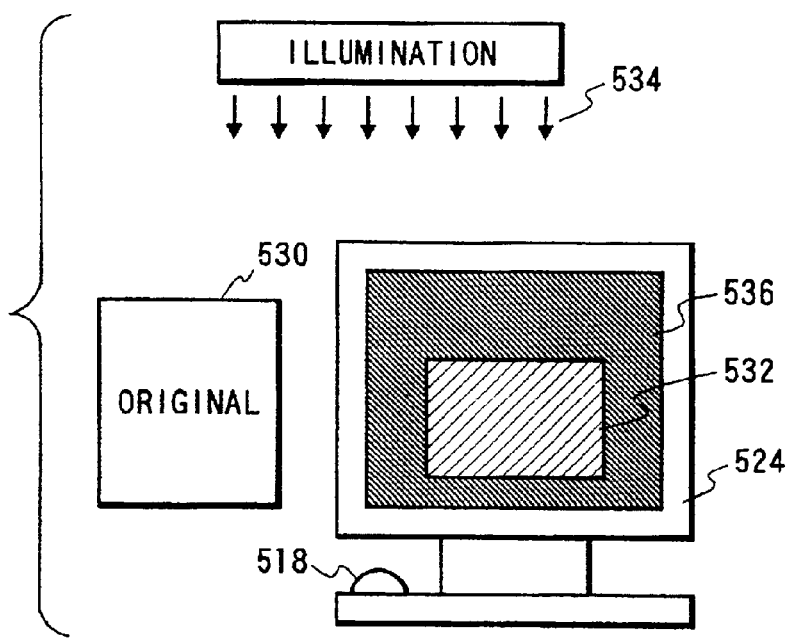
FIG. 15 is a diagram for explaining a general use environment.
Figure 14:
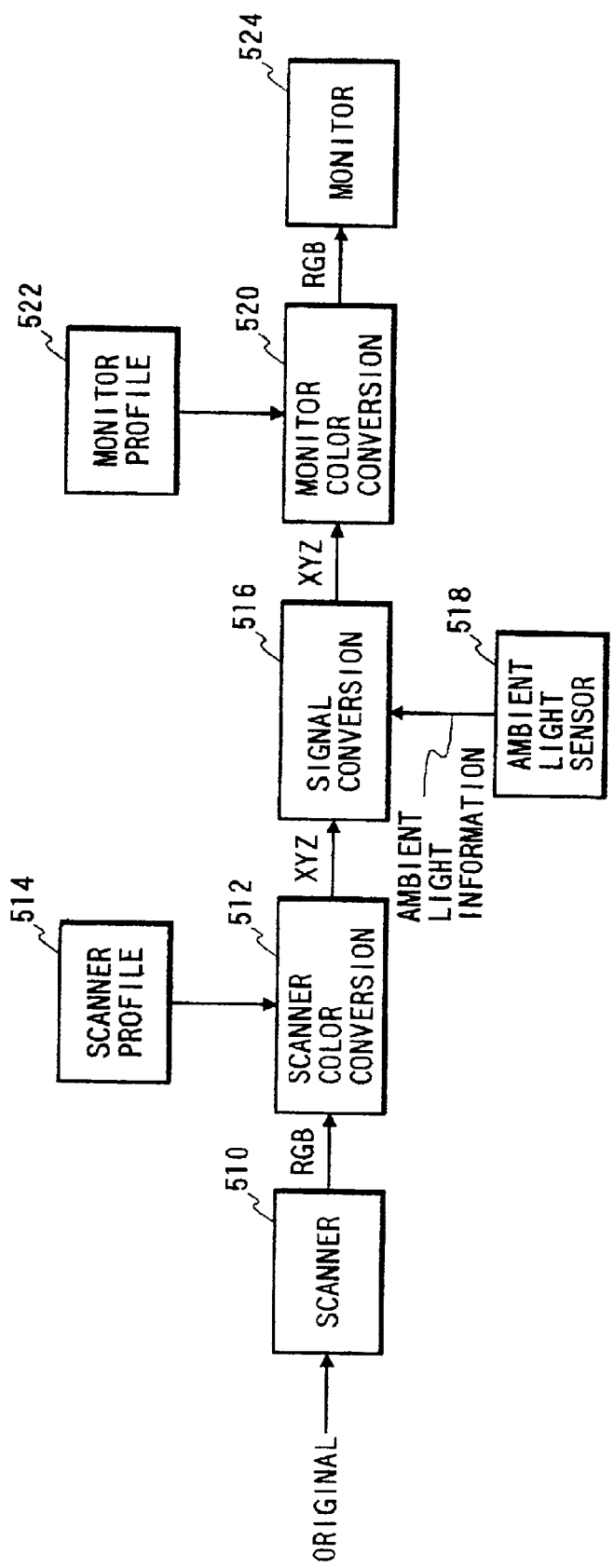
FIG. 14 is a schematic constructional block diagram of the prior art.

FIG. 12 shows a flowchart of a main operation portion of the modification shown in FIG. 11.

By the color processing setting device 50, the user sets the color processing method (color matching mode) to be executed by the signal conversion device 16 in accordance with an application (S1). It can be set by a menu bar or the like or can also be selected by pushing a button. Further, it is also possible to determine the default in a manner such that the color managing process as described in the embodiment shown in FIG. 7 is performed and a highly-accurate color management is executed in the other cases.

In case of the highly-accurate color management (S1), the background color of the screen of the monitor 24 is set to a predetermined color (S5). In the case where the highly-accurate color management is not performed (in case of the ordinary color management) (S1), the present background color is maintained as is.

In order to perform the highly-accurate color management, it is necessary to control the background color. Therefore, when a plurality of windows are opened on the same screen, the other windows are hidden by the background color. On the other hand, when the highly-accurate color management is not performed, processes can be executed in parallel with reference to the other windows. The user, accordingly, sets the color processing method on the basis of the application (whether a priority is given to the precision of the color matching or not) in step S1.

The subsequent processes are substantially the same as those in the embodiment shown in FIG. 7. The signal conversion device 16 sets the optimum adaptation ratio from the ambient light information from the ambient light sensor 18, the monitor white information, and the background color of the monitor and converts the output signal of the scanner color conversion device 12 in accordance with the reference white signal that is decided on the basis of the adaptation ratio (S2). The monitor color conversion device 20 converts the output signal of the signal conversion device 18 from the XYZ colorimetric system to the RGB colorimetric system (S3). The output image signal of the monitor color conversion device 20 is displayed at a predetermined position on the screen of the monitor 24 (S4).

In case of the highly-accurate color management, since the background color is a predetermined color, the color matching can be performed at a higher accuracy. As a background color in this case, for example, a background color which has been set in the environment at the time of the formation of the profile or a standard environment at the time of the color observation or a background color that is optimum to every environment has been prepared and the proper background color is selected among them in accordance with the present environment.

In the modification shown in FIG. 11, the decided background color has been displayed only in case of selecting the highly-accurate color management process. However, it is also possible to enable whether or not the color management is performed to be selected and to automatically display the determined background color in case of executing the color management.

As for the background color of the monitor when the image is observed, the standard observing condition at the time of the formation of the profile can be determined and such information can be stored into the profile as mentioned above. However, in any case, it will be understood that when a luminance of the background color to be displayed on the monitor is lower than that of white in the observation image (white in the print original), it is more desirable in case of matching both of the colors. White in the observation image (white in the print original) is obtained from a reflectance of the paper which has previously been known and the light source information derived from the ambient light sensor 18. When the luminance of white in the print image is equal to or less than the luminance of the highest output of the monitor, it is desirable to use the luminance of the background color having a value smaller than that of white in the observation image.

For example, when the image is observed in an environment in which the luminance of white in the observation image and the highest luminance of the monitor are equal and, after that, the luminance of the ambient light of the room decreases, a phenomenon such that both of the colors cannot be matched because the background color of the monitor is too bright occurs. However, by setting the luminance of the monitor background color to be lower than that of white in the observation image, an environment in which the color matching is more available can be formed.

As means for obtaining the ambient light information, it is possible to detect the ambient light of the environment in which the image is at present observed by a sensor or to previously measure the ambient light by the user by using an illumination photometer, a luminance meter, or the like and to input the measured value to the signal conversion device 16. It is also possible to use a method whereby several selection items have already been made and a proper value that is closest to the present environment is selected among them.

By calculating white in the observation image from the ambient light information obtained and the well-known reflectance of the paper and by changing the background color of the monitor so that the luminance of the background color is lower than that of such white, both of the colors can be matched.

The invention is not limited to the above embodiment. For example, the invention can be applied to the color signal conversions of various input/output equipment. Namely, the invention can be used in every image processing apparatus for performing the color signal conversion.

It will be obviously understood that the monitor display is not limited to the CRT display but can also use a liquid crystal display.

According to the embodiment 3 and its modification as described above, in the correction to match the light source color and the observation color of the object color, the reference white is calculated on the basis of not only the ambient light but also the background color in case of observing the image and the whole image is converted in accordance with the calculated reference white. Therefore, the observation color of the display image can be also matched to a different background color.

By forcedly setting the background color to a predetermined color, the observation color can be more accurately matched.

By setting the luminance of the background color to be lower than that of white of the image (white in the print image), both of the colors can be matched.

By performing the color temperature conversion by reference white suitable for the observation environment, the color tones can be preferably matched.

A highly-accurate color matching can be provided on the basis of an application of the user.

<Other embodiments>

The invention can be applied to a system constructed by a plurality of equipment (for example, a host computer, an interface equipment, a reader, a printer, or the like) or can also be applied to an apparatus comprising one equipment (for example, a copying apparatus or a facsimile apparatus).

An invention embodied by a method whereby program codes of a software to realize the functions of the embodiment are supplied to a computer in an apparatus or system connected to various devices so as to make the devices operative in order to realize the functions of the foregoing embodiments and the various devices are operated in accordance with the programs stored in the computer (CPU or MPU) of the system or apparatus is also included in the scope of the invention.

In such a case, the program codes themselves of the software realize the functions of the foregoing embodiments and the program codes themselves and means for supplying the program codes to the computer, for example, a memory medium in which the program codes have been stored construct the invention.

As such a memory medium to store the program codes, for example, it is possible to use a floppy disk, a hard disk, an optical disk, a magnetooptic disk, a CD-ROM, a magnetic tape, a non-volatile memory card, an ROM, or the like can be used.

It will be obviously understood that the program codes are included in the embodiments of the invention even in not only a case where the functions of the foregoing embodiments are realized by executing the supplied program codes by the computer but also a case where the functions of the foregoing embodiments are realized in cooperation with the OS (operating system) by which the program codes operate in the computer or another application software or the like.

Further, it will be also obviously understood that the invention also incorporates a case where the supplied program codes are stored into a memory provided for a function expansion board of a computer or a function expansion unit connected to a computer and, after that, a CPU or the like provided for the function expansion board or function expansion unit executes a part or all of the actual processes on the basis of instructions of the program codes, and the functions of the foregoing embodiments are realized by the processes.

Although the present invention has been described above with respect to the preferred embodiments, the invention is not limited to the foregoing embodiments, and many modifications and variations are possible within the spirit and scope of the appended claims of the invention.

What is claimed is:

1. An image processing apparatus comprising:
   input means for inputting input image data from a source device having a function for adjusting an image processing condition on a basis of an instruction of a user;
   converting means for converting the input image data to device independent image data by using a profile of the source device; and setting means for setting a standard condition included in the profile as an image processing condition of the source device, wherein the adjusted image processing condition corresponding to the instruction of the user is made invalid, and wherein the input image data subjected to conversion by said converting means is generated by the source device by using the standard condition set by said setting means.

2. An apparatus according to claim 1, wherein the standard condition corresponds to a condition used when the profile is prepared.

3. An apparatus according to claim 1, wherein the source device is a display device, and wherein the image processing condition includes any one of conditions relating to gamma characteristic, contrast, brightness, color, and temperature.

4. An apparatus according to claim 1, wherein said converting means performs a color matching process corresponding to the source device and an image output device, and wherein said converting means converts the device independent image data to image data for the image output device by using an output profile of the image output device, and further comprising:

correction means for correcting the converted image data by using the standard condition included in the output profile.

5. An apparatus according to claim 1, wherein the source device includes correction means for correcting image data by using the standard condition set by said setting means.

6. An image processing apparatus comprising:

converting means for converting input image data by using a source profile of a source device and an output profile of an image output device;

output means for outputting the converted image data to the image output device having a function for adjusting an image output condition on a basis of an instruction of a user; and setting means for setting a standard condition included in the output profile as an image output condition of the image output device, wherein the adjusted image output condition corresponding to the instruction of the user is made invalid, and wherein the image output device processes the converted image data by using the standard condition set by said setting means.

7. An image processing method comprising:

an input step, of inputting input image data from a source device having a function for adjusting an image processing condition on a basis of an instruction of a user;

a converting step, of converting the input image data to device independent image data by using a profile of the source device; and a setting step, of setting a standard condition included in the profile as an image processing condition of the source device, wherein the adjusted image processing condition corresponding to the instruction of the user is made invalid, and wherein the input image data subjected to conversion in said converting step is generated by the source device by using the standard condition set in said setting step.

8. A recording medium to store a program to execute an image processing method, said program comprising:

code for an inputting step, of inputting input image data from a source device having a function for adjusting an image processing condition on the basis of an instruction of a user;

code for a converting step, of converting the input image data to device independent image data by using a profile of the source device; and code for a setting step, of setting a standard condition included in the profile as an image processing condition of the source device, wherein the adjusted image processing condition corresponding to the instruction of the user is made invalid, and wherein the input image data subjected to conversion by said converting code is generated by the source device by using the standard condition set by said setting code.

9. An image processing method comprising:

a converting step, of converting input image data by using a source profile of a source device and an output profile of an image output device;

an output step, of outputting the converted image data to the image output device having a function for adjusting an image output condition on the basis of an instruction of a user; and a setting step, of setting a standard condition included in the output profile as an image output condition of the image output device, wherein the adjusted image output condition corresponding to the instruction of the user is made invalid, and wherein the image output device processes the converted image data by using the standard condition set in said setting step.

10. A recording medium to store a program to execute an image processing method, said method comprising:

code for a converting step, of converting input image data by using a source profile of a source device and an output profile of an image output device;

code for an output step, of outputting the converted image data to the image output device having a function for adjusting an image output condition on the basis of an instruction of a user; and code for a setting step, of setting a standard condition included in the output profile as an image output condition of the image output device, wherein the adjusted image output condition corresponding to the instruction of the user is made invalid, and wherein the image output device processes the converted image data by using the standard condition set by said setting code.

11. An image processing apparatus comprising:

an input unit, adapted to input image data from a source device having a function for adjusting an image processing condition on a basis of an instruction of a user;

a converting unit, adapted to convert the input image data to device independent image data by using a profile of the source device; and a setting unit, adapted to set a standard condition included in the profile as an image processing condition of the source device, wherein the adjusted image processing condition corresponding to the instruction of the user is made invalid, and wherein the input image data subjected to conversion by said converting unit is generated by the source device by using the standard condition set by said setting unit.

12. An image processing apparatus comprising:

a converting unit, adapted to convert input image data by using a source profile of a source device and an output profile of an image output device;

an output unit, adapted to output the converted image data to the image output device having a function for adjusting an image output condition on a basis of an instruction of a user; and a setting unit, adapted to set a standard condition included in the output profile as an image output condition of the image output device, wherein the adjusted image output condition corresponding to the instruction of the user is made invalid, and wherein the image output device is adapted to process the converted image data by using the standard condition set by said setting unit.

* * * * *

UNITED STATES PATENT AND TRADEMARK OFFICE
CERTIFICATE OF CORRECTION

PATENT NO. : 6,954,213 B1
DATED : October 11, 2005
INVENTOR(S) : Yumiko Hidaka et al.

Page 1 of 1

It is certified that error appears in the above-identified patent and that said Letters Patent is hereby corrected as shown below:

<u>Title page,</u>
Item [56], References Cited, U.S. PATENT DOCUMENTS, insert
-- 5,559,604    9/1996          Arai            356/402--.
FOREIGN PATENT DOCUMENTS, delete
"EP  0565283        10/1993       H04N/1/46"; and insert
-- EP  0173032      3/1986        H04N/1/46 --.

<u>Column 1,</u>
Line 16, "know" should read -- known --;
Line 23, "(CMS)" should read -- (CMS), --;
Line 49, "in" should read -- on --; and "further" should read -- yet --.

<u>Column 3,</u>
Line 33, "human being recognizes the" should read -- the human being recognizes --.

<u>Column 6,</u>
Line 55, "a a" should read -- a --.

Signed and Sealed this

Thirteenth Day of June, 2006

JON W. DUDAS
*Director of the United States Patent and Trademark Office*